United States Patent Office 3,452,006
Patented June 24, 1969

---

3,452,006
PROCESS FOR THE PREPARATION OF 6-METHYL-3β,5α,17α - TRIHYDROXY - 20 - CYCLIC KETAL PREGNANE DERIVATIVE
David Neville Kirk, Vladimir Petrow, Martin Stansfield, and David Morton Williamson, London, England, assignors to The British Drug Houses Limited
No Drawing. Continuation of application Ser. No. 33,642, June 3, 1960. This application July 1, 1966, Ser. No. 562,407
Claims priority, application Great Britain, June 11, 1959, 20,028/59
Int. Cl. C07c *167/00, 173/00, 169/32*
U.S. Cl. 260—239.55                                    1 Claim

ABSTRACT OF THE DISCLOSURE

Process for preparing a 6β-methyl,3β,5α,17α-trihydroxy 20-cyclic ketal pregnane derivative comprising reacting a 3β-hydroxy- or a 3β-acyloxy-16-methylpregna-5,16-diene-20-one with hydrogen peroxide under alkaline conditions followed by acylation to provide the 3β-acyloxy-16α,17α-epoxy - 16β-methyl-pregn-5-en-20-one, treating the 16α,17α-epoxide compound with a hydrogen halide to cleave the epoxy group with formation of a 17α-hydroxy group, condensing the resulting steroid with an alkane diol to form the corresponding 20-cyclic ketal derivative, treating said 20-cyclic ketal derivative with an organic per-acid to form the corresponding 5α,6α-epoxide of said 20-cyclic ketal derivative and treating said 5α,6α-epoxide with a methyl-magnesium halide followed by alkaline hydrolysis to cleave the 5α,6α-epoxide group and provide the corresponding 6β-methyl,3β,5α,17α-trihydroxy-20-cyclic ketal.

---

This application is continuation of application Ser. No. 33,642 filed June 3, 1960, now abandoned.

This invention is for improvements in or relating to the preparation of organic compounds and has particular reference to a process for the preparation of a 20-cyclic ketal derivative of 3β,5,17α-trihydroxy-6β - methyl - 16-methylene-5α-pregnan-20-one having the general Formula I below.

This compound is of value as an intermediate in the preparation of compounds with progestational properties. Thus for example it may be converted into 17α-hydroxy and 17α - acyloxy-6α-methyl-16-methylenepregn-4-ene-3,20-diones which compounds possess outstanding progestational properties.

For this purpose the ketal group at $C_{20}$ is removed from the product of the invention. Hydrolysis of the resulting 3 - acetoxy - 5α-17α-dihydroxy-6β-methyl-16-methylene-5α-pregnan-20-one yields the corresponding 3,5,17-triol-20-one. Oxidation of the last compound gives 5α,17α-dihydroxy - 6β - methyl - 16 - methylene-5α-pregnane-3,20-dione. Dehydration of the last compound at $C_5$ and epimerisation of the methyl group at $C_6$ gives 17α-hydroxy-6α - methyl - 16-methylene-pregn-4-ene-3,20-dione which passes into the active progestational compound on acetylation at $C_{17}$.

According to the present invention there is provided a process for the preparation of a 20-cyclic ketal derivative of 3β,5,17α-trihydroxy-6β-methyl-16-methylene-5α - pregnan-20-one having the formula

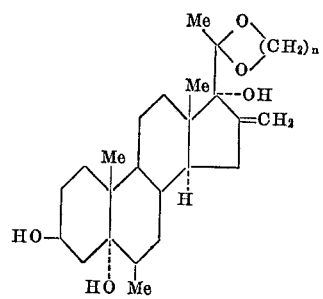

(I)

(where $n=2$ or 3) which process comprises reacting a 3β-hydroxy or 3β-acyloxy-16-methylpregna-5,16-dien-20-one having the general formula

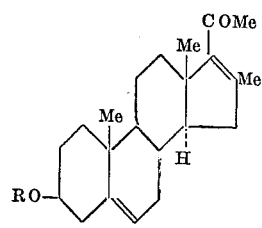

(II)

where R is hydrogen or an acyl group containing up to 10 carbon atoms with an alkaline peroxidising agent capable of converting α,β-unsaturated ketones into their epoxides followed by acylation to form a 3β-acyloxy-16α-17α-epoxy-16β-methylpregn-5-en-20-one having the general formula

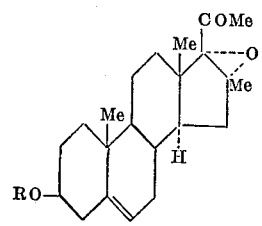

(III)

(where R is an acyl group containing up to 10 carbon atoms), reacting the 16α,17α-epoxide with hydrogen bromide or hydrogen iodide, reductively treating if desired the resulting material to give a 3β-acyloxy-17α-hydroxy-16-methylenepregn-5-en-20-one having the general formula

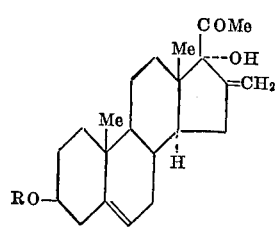

(IV)

(where R is an acyl group containing up to 10 carbon atoms), reacting the 3β-acyloxy-17α-hydroxy-16-methylenepregn-5-en-20-one with an alkane diol to form its 20-cyclic ketal derivative having the general formula

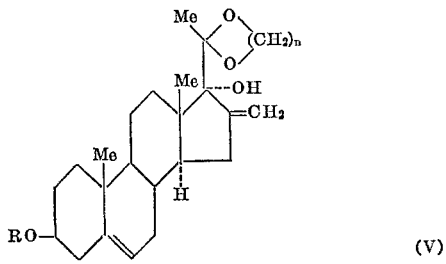

(where R is an acyl group containing up to 10 carbon atoms and n=2 or 3), reacting the 20-cyclic ketal derivative with an organic per-acid to form a 5α,6α-epoxide having the general formula

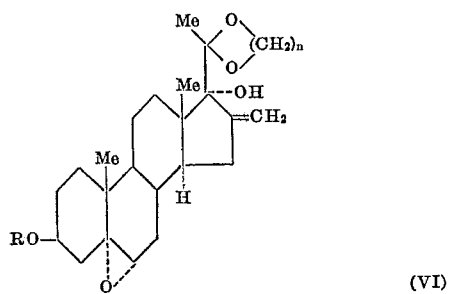

(where R is an acyl group containing up to 10 carbon atoms and n=2 or 3), and treating the 5α,6α-epoxide with a methylmagnesium halide followed by alkaline hydrolysis.

The 17α-hydroxy compounds designated by Formulae I, IV, V and VI originally believed to be 16-methyl compounds are now found to possess a methylene group at the 16-position.

In carrying out the process of this invention the 3β-hydroxy or 3β-acyloxy-16-methylpregna-5,16-dien-20-one (II) is converted into the 16α,17α-epoxide by reaction with a peroxidising agent under alkaline conditions, and in particular by reaction with alkaline hydrogen peroxide in a water-miscible organic solvent, such for example as methanol or ethanol, at temperatures between 0° C. and 100° C. and preferably at the reflux temperature of the reaction mixture. Other peroxidising agents such, for example, as tert.-butyl hydroperoxide under alkaline conditions may also be employed.

The 16α,17α-epoxide (III) so formed is obtained as the free 3-hydroxy derivative (III; R=H). It is converted into the 3β-acyloxy derivative (III; R=acyl), and preferably into the 3β-acetoxy derivative, by acylation for example with acetic anhydride/pyridine, which is a method well known to those skilled in the art.

The 3β-acyloxy derivative (III; where R is acyl) is preferably treated with hydrogen bromide which may be added in solution in a lower aliphatic acid such as acetic acid to the 3β-acyloxy derivative, preferably dissolved in a mixture of a lower aliphatic acid such as acetic acid and an inert organic solvent such as benzene at a temperature which is preferably in the region of 0° C. The material so obtained may be isolated from the mixture by known methods. Alternatively hydrogen iodide may be employed and may be added in aqueous solution to the epoxide (III; where R is acyl) dissolved in a water-miscible organic solvent, such for example as dioxan, at a temperature in the region of 0° C. Care must be exercised in this operation, which must additionally be carried out speedily and preferably in the absence of light.

When reductive treatment of the material so obtained is desired it may be carried out by a process of catalytic reduction employing a catalyst such as Raney nickel in an organic solvent such as acetone at the ambient temperature. The product obtained is the 17α-hydroxy-16-methylene derivative (IV).

Conversion of the resulting 3β-acyloxy-17α-hydroxy-16-methylenepregn-5-en-20-one into the 20-cyclic ketal derivative (V; where R is acyl) is performed by treating the intermediate (IV) with an alkane diol which may be ethane-1,2-diol or propane-1,3-diol in a water-immiscible organic solvent such as benzene in the presence of a catalytic quantity of an acidic catalyst such as toluene-p-sulphonic acid at the reflux temperature of the reaction mixture in an appropriate apparatus such as the Dean-Stark apparatus which permits removal of water formed in the reaction.

Conversion of the resulting 20-ketal derivative (V) into the 5α,6α-epoxide (VI; where R=acyl) may be performed by reaction with peracetic, perbenzoic or monoperphthalic acid in an inert organic solvent such as benzene, chloroform, ether, or mixtures of such inert solvents. The reaction is preferably performed at temperatures between −20° C. and +30° C. and conveniently at ca. 0° C. As known to those skilled in the art, such epoxidation invariably results in the formation of a mixture of 5α,6α- and 5β,6β-epoxides, from which the required 5α,6α-epoxide may be separated by a process of fractional crystallisation, for which purpose a solvent such as methanol is conveniently employed.

Conversion of the epoxide (VI; where R=acyl) into the desired 3β,5,17α-trihydroxy - 6β - methyl - 16 - methylene-5α-pregnan-20-one (I) is preferably effected by treatment with methylmagnesium bromide or iodide in an inert water-free organic solvent such as diethyl ether, dibutyl ether, benzene, toluene, tetrahydrofuran, or in mixtures of such solvents at a temperature preferably between 20° C. and 100° C.

Following is a description by way of example of methods of carrying the invention into effect.

EXAMPLE 1

3β-hydroxy-16α,17α-epoxy-16β-methylpregn-5-en-20-one

Hydrogen peroxide (100 vol.; 120 ml.) was added dropwise to a refluxing solution of 3β-acetoxy-16-methylpregn-5,16-dien-20-one (60 g.) in ethanol (600 ml.) and aqueous sodium hydroxide (40%; 30 ml.). The mixture was then heated under reflux for 20 minutes, cooled and the resultant solid was collected by filtration and crystallised from acetone/hexane to give 3β-hydroxy-16α,17α-epoxy-16β-methylpregn-5-en-20-one as prisms, M.P. 189 to 191° C., [α]$_D^{22}$ −16° (c., 0.64 in chloroform)

3β-acetoxy-16α,17α-epoxy-16β-methylpregn-5-en-20-one (III; R=CH$_3$CO)

The above 3-hydroxy compound (61 g.) was dissolved in pyridine (250 ml.) and acetic anhydride (250 ml.) and warmed on the steam-bath for 1 hour. The solution was cooled, poured into a large excess of water and the product was collected by filtration. Crystallization from methanol gave 3β-acetoxy-16α,17α-epoxy - 16β - methylpregn-5-en-20-one as blades, M.P. 179 to 181° C., [α]$_D^{23}$ −17° (c., 0.78 in chloroform).

3β-acetoxy-17α-hydroxy-16-methylenepregn-5-en-20-one (IV; R=CH$_3$CO)

3β-acetoxy-16α,17α-epoxy-16β-methylpregn - 5 - en - 20 one (III; R=CH$_3$CO) (63 g.) was dissolved in glacial acetic acid (1 l.) and benzene (1 l.) and cooled in ice/water. A solution of hydrogen bromide in acetic acid (50%; 100 ml.) was then added and the solution was stirred at 0° C. for 30 minutes. An equal volume of water was then added and the mixture was extracted with chloroform. The chloroform extracts were washed with water, aqueous sodium bicarbonate and dried (Na$_2$SO$_4$), and the solvent was removed under reduced pressure. The residue was dissolved in acetone (2 l.), Raney nickel (300 ml. suspension) added and the reaction mixture stirred at room temperature for 4 hours after which it was filtered through "Hyflo" and the residue was washed with hot acetone. The filtrate was then evaporated under reduced pressure and crystallised from methanol. The product was 3β-acetoxy - 17α-hydroxy-16 - methylenepregn-5-en-20-one, M.P. 184 to 186° or 206 to 208° C., $[\alpha]_D^{24}$ −126° (c., 0.36 in chloroform).

3β-acetoxy-20,20-ethylenedioxy-17α-hydroxy-16-methylenepregn-5-ene (V; R=CH₃CO, n=2)

A mixture of 3β-acetoxy-17α-hydroxy-16-methylenepregn-5-en-20-one (IV; R=CH₃CO) (59 g.), ethane-1,2-diol (116 ml.) and benzene (2320 ml.) was distilled until traces of moisture had been removed. After addition of toluene-p-sulphonic acid monohydrate (5.8 g.) the mixture was stirred under reflux for 6 hours, the water produced being continually removed by a Dean-Stark apparatus. The mixture was then poured into dilute aqueous potassium carbonate and extracted with ether. The combined extracts were washed with water, and dried (Na₂SO₄). Removal of the solvent under reduced pressure and crystallisation of the residue from methanol (+1 drop pyridine) gave 3β-acetoxy-20,20-ethylenedioxy - 17α-hydroxy-16-methylenepregn-5-ene as needles, M.P. 183 to 184° C., $[\alpha]_D^{24}$ −101° (c., 0.33 in chloroform+1 drop pyridine).

3β-acetoxy-5, 6α-epoxy-20,20-ethylenedioxy-17α-hydroxy-16-methylene-5α-pregnane (VI; R=CH₃CO, n=2)

An ethereal solution of monoperphthalic acid (1.0 N; 300 ml.) was added to 3β-acetoxy-20,20-ethylenedioxy-17α-hydroxy-16-methylenepregn-5-ene (V; R=CH₃CO, n=2) in chloroform (200 ml.) and the reaction mixture kept at 0° C. for 4 hours. The mixture was then washed with dilute sodium hydroxide solution, water and dried (Na₂SO₄). Removal of the solvent under reduced pressure and crystallisation of the residue from methanol (+1 drop pyridine) gave 3β-acetoxy-5,6α-epoxy-20,20-ethylenedioxy-17α-hydroxy-16-methylene-5α-pregnane as plates, M.P. 215 to 217° C., $[\alpha]_D^{24}$ −101° (c., 0.29 in chloroform+1 drop pyridine).

20,20-ethylenedioxy-3β,5,17α-trihydroxy-6β-methyl-16-methylene-5α-pregnane (I, n=2)

Methylmagnesium iodide was prepared in the usual manner from magnesium (2.8 g.), methyl iodide (20 g.) and anhydrous ether (100 ml.). 3β-acetoxy-5,6α-epoxy-20,20 - ethylenedioxy - 17α - hydroxy-16-methylene-5α-pregnane (VI; R=CH₃CO, n=2) (3.9 g.) in anhydrous benzene (200 ml.) was added and the ether was removed by distillation. The reaction mixture was then stirred under reflux for 3 hours. After cooling, the mixture was decomposed with aqueous ammonium chloride and the product was isolated by extraction with ether. The combined extracts were washed with water and dried (Na₂SO₄), and the solvent was removed under reduced pressure. Crystallisation of the residue from acetone/hexane gave 3β,5,17α-trihydroxy-20,20-ethylenedioxy-6β-methyl-16-methylene-5α-pregnane, $\gamma_{max}^{Nujol}$ 3480 cm.⁻¹

EXAMPLE 2

3β-acetoxy-17α-hydroxy-16-methylenepregn-5-en-20-one (IV; R=CH₃CO)

3β - acetoxy - 16β - methyl-16α,17α-epoxypregn-5-en-20-one (III; R=CH₃CO) (17 g.), prepared as given in Example 1, was dissolved in dioxan (750 ml.), cooled to 0° C. and treated with aqueous hydrogen iodide (50%; 125 ml.) in the absence of light. After being stirred at 0° C. for 30 minutes in the absence of light, the reaction mixture was added dropwise with stirring to water (2.5 l.), stirring being continued until the product coagulated. The mixture was then filtered, the residue being washed with water and dried. The iodinated material was removed by dissolving in acetone (750 ml.) adding Raney nickel (85 g.) and stirring at room temperature for 30 minutes. Methylene dichloride was then added, the mixture filtered through "Hyflo" and the residue was washed with methylene dichloride. Removal of the solvent under reduced pressure and crystallisation of the residue from methanol gave 3β-acetoxy-17α-hydroxy-16-methylenepregn-5-en-20-one, M.P. 180 to 182° C. alone and on admixture with a sample prepared according to Example 1.

3β,5,17α-trihydroxy-20,20-ethylenedioxy-6β-methyl-16-methylene-5α-pregnane

Treatment of 3β-acetoxy-17α-hydroxy-16-methylenepregn-5-en-20-one (IV; R=CH₃CO) according to the steps outlined in Example 1 gave 3β,5,17α-trihydroxy-20,20 - ethylenedioxy - 6β-methyl-16-methylene-5α-pregnane.

What is claimed is:

1. A process for the preparation of a 3β-5α,17α-trihydroxy-6β-methyl-20-cyclic ketal derivative of a steroid compound having the formula

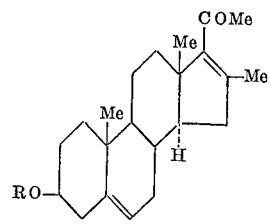

where R is selected from the group consisting of hydrogen and an acyl group derived from a hydrocarbon carboxylic acid containing up to 10 carbon atoms, comprising reacting a steroid compound of said formula with hydrogen peroxide under alkaline conditions followed by acylation with an acylating agent providing an acyl group as defined above to form a 3β-acyloxy-16α,17α-epoxy compound of the formula

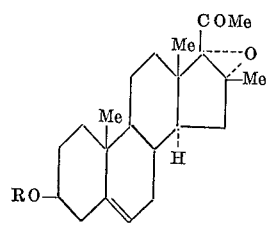

where R is an acyl group as defined above, treating the 16α,17α-epoxy compound with a hydrogen halide to cleave the epoxy group and provide a 17α-hydroxy group, subjecting the resulting 17α-hydroxy steroid compound to reductive treatment employing Raney nickel in an organic solvent, condensing the resulting steroid compound with an alkane diol having from 2 to 3 carbon atoms to form the 20-cyclic ketal derivative, treating said 20-cyclic ketal derivative with an organic per-acid selected from the group consisting of peracetic, perbenzoic and monoperthalic acids to form a 5α,6α-epoxy compound with methyl magnesium halide followed by alkaline hydrolysis to provide the said 6β-methyl-3β,5α,17α-trihydroxy-20-cyclic ketal pregnane derivative.

References Cited

UNITED STATES PATENTS 3,312,692   4/1967   Olive et al.

ELBERT L. ROBERTS, Primary Examiner.

U.S. Cl. X.R.

260—397.4